US012578007B2

(12) United States Patent
Erker

(10) Patent No.: US 12,578,007 B2
(45) Date of Patent: Mar. 17, 2026

(54) LINEAR DRIVE APPARATUS FOR CONVERTING A ROTATIONAL MOVEMENT INTO A LINEAR MOVEMENT AND MEDICAL TECHNOLOGY APPARATUS

(71) Applicant: Siemens Healthineers AG, Forchheim (DE)

(72) Inventor: Christian Erker, Erbendorf (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 18/815,126

(22) Filed: Aug. 26, 2024

(65) Prior Publication Data

US 2025/0075777 A1 Mar. 6, 2025

(30) Foreign Application Priority Data

Aug. 29, 2023 (DE) ..................... 10 2023 208 272.1

(51) Int. Cl.
| | |
|---|---|
| *F16H 25/20* | (2006.01) |
| *H02K 7/06* | (2006.01) |
| *A61G 13/02* | (2006.01) |

(52) U.S. Cl.
CPC ............... *F16H 25/20* (2013.01); *H02K 7/06* (2013.01); *A61G 13/02* (2013.01); *F16H 2025/2075* (2013.01)

(58) Field of Classification Search
CPC ... F16H 25/20; F16H 2025/2075; H02K 7/06; A61G 13/02
See application file for complete search history.

(56) References Cited

U.S. PATENT DOCUMENTS

| | | | | |
|---|---|---|---|---|
| 4,856,356 A | * | 8/1989 | Gartner | ............... F16H 25/2295 74/25 |
| 2007/0169265 A1 | * | 7/2007 | Saracen | ............... A61B 6/0487 5/601 |
| 2015/0342809 A1 | * | 12/2015 | Doppler | ................. F16H 25/20 5/611 |

FOREIGN PATENT DOCUMENTS

| | | | | | |
|---|---|---|---|---|---|
| DE | 2358882 A1 | 6/1975 | | | |
| DE | 3616905 A1 | 11/1987 | | | |
| DE | 4002151 A1 | 8/1991 | | | |
| DE | 10148970 A1 | 6/2002 | | | |
| DE | 10148970 B4 | * | 12/2007 | ........... | F16H 25/229 |
| DE | 102016209161 A1 | 11/2017 | | | |
| DE | 102020105928 A1 | 9/2021 | | | |

* cited by examiner

*Primary Examiner* — Zakaria Elahmadi
(74) *Attorney, Agent, or Firm* — Harness, Dickey & Pierce, P. L. C.

(57) ABSTRACT

One or more example embodiments relates to a linear drive apparatus for converting a rotational movement into a linear movement.

17 Claims, 4 Drawing Sheets

FIG 4

LINEAR DRIVE APPARATUS FOR CONVERTING A ROTATIONAL MOVEMENT INTO A LINEAR MOVEMENT AND MEDICAL TECHNOLOGY APPARATUS

CROSS-REFERENCE TO RELATED APPLICATION(S)

The present application claims priority under 35 U.S.C. § 119 to Germany Patent Application No. 10 2023 208 272.1, filed Aug. 29, 2023, the entire contents of which is incorporated herein by reference.

FIELD

One or more example embodiments relates to a linear drive apparatus for converting a rotational movement into a linear movement. One more or more example embodiments also relates to a medical technology apparatus, in particular a patient support table or an imaging device, having a first component and second component which can move relative to the first component.

RELATED ART

A linear drive apparatus is used to couple at least two structural elements together mechanically in such a way that a rotational or turning movement of one of the structural elements is converted into a linear or advance movement of the other structural element and vice versa. For this purpose, the prior art discloses, for example, rolling screw-thread drives which have a recirculating ball screw or can be realized as a planetary roller screw-thread drive.

In the case of a screw-thread drive with a recirculating b ball screw, balls are guided in a helical guideway that is disposed on the outside of the spindle. Arranged along the longitudinal direction of the spindle is a guide block which is supported on the spindle via the balls. A turning movement that is present between the spindle and the guide block results in an advance movement between these components.

In the case of a planetary roller screw-thread drive, planetary rollers are held in a circulating nut in such a way that a rotation of the circulating nut about a threaded spindle results in an axial relative movement between the circulating nut and the threaded spindle. A planetary roller screw-thread drive has the advantage that only little wear occurs as a result of the rolling movements that are present. Moreover, via appropriately selecting the diameter of the threaded spindle and the planetary rollers, it is possible to realize a gear function with a specific transmission ratio. The use of a planetary roller screw-thread drive also means that this can be deployed in the form of a so-called direct drive, such that the planetary roller screw-thread drive which functions as a drive machine and the structural element that must be driven are directly connected without a separate gear being provided between them.

SUMMARY

The planetary roller screw-thread drive has the disadvantage of being expensive to manufacture.

One or more example embodiments provides an improved concept for a linear drive apparatus, in particular such that the advantages of a planetary roller screw-thread drive are realized and greater ease of manufacture and realization is possible.

BRIEF DESCRIPTION OF THE DRAWINGS

Further advantages and details of the present invention are revealed by the exemplary embodiments set forth in the following and with reference to the figures, in which.

DETAILED DESCRIPTION

Figure 1:
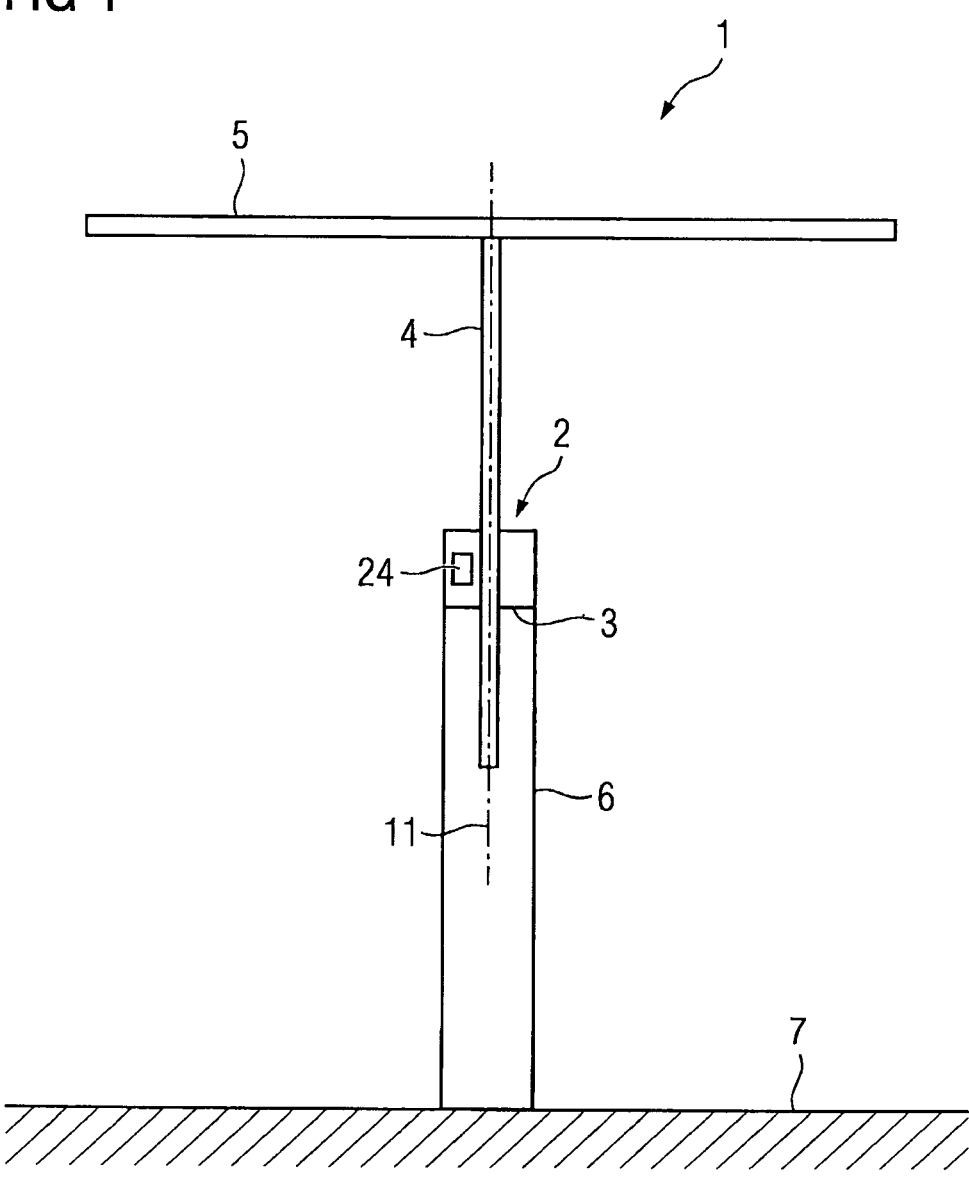
FIG. 1 schematically shows an elementary diagram of an inventive medical technology apparatus according to an exemplary embodiment, said medical technology apparatus representing a patient support table, FIG. 2 schematically shows a sectional view of an inventive linear drive apparatus according to a first exemplary embodiment, which can be provided as a component of the medical technology apparatus shown in FIG. 1, FIG. 3 schematically shows a further sectional view of the linear drive apparatus from FIG. 2, the sectional plane being indicated by the line III-III in FIG. 2, and FIG. 4 schematically shows a sectional view of an inventive linear drive apparatus according to a second exemplary embodiment, which can be provided as a component of the medical technology apparatus shown in FIG. 1.

According to one or more example embodiments a linear drive apparatus is inventively achieved in that it comprises an outer casing and an inner casing which is supported in the outer casing via at least one main bearing in such a way that the inner casing is able to rotate about a main axis, this being positionally fixed relative to the outer casing, and is positionally fixed linearly along the main axis, wherein a ring is supported in the inner casing via at least one radial bearing in such a way that the ring is able to rotate about a ring axis, this being positionally fixed relative to the inner casing, and is positionally fixed linearly along the ring axis, wherein a spindle is provided which extends along the main axis and passes through the outer casing, the inner casing and the ring, wherein an inner contour is provided on an inner surface of the ring and an outer contour is provided on an outer surface of the spindle, wherein the main axis and the ring axis are arranged relative to each other in such a way that the inner casing and the ring are supported in a reciprocally eccentric manner, and the outer contour and the inner contour engage locally with each other along a circumferential direction extending around the main axis, wherein the interacting contours result in a linear movement of the spindle along the main axis when the ring is rotated about the ring axis.

One of the features of the linear drive apparatus according to one or more example embodiments is that the main axis and the ring axis are arranged relative to each other in such a way that the inner casing and the ring are supported in a reciprocally eccentric manner. This is achieved for example by virtue of the main axis and the ring axis running parallel and apart from each other. Provision is preferably made for the main axis and the ring axis to run approximately or exactly parallel.

The present invention is based in particular on the idea that the spindle and the ring are supported in such a way that they can turn eccentrically relative to each other, in particular having parallel axes and being slightly offset, so that the contours of these components engage laterally with each other. By virtue of a pulling effect, a turning movement of the inner casing about the main axis results in a turning movement in the same direction of the ring about the ring axis and vice versa. The turning movement of the ring about the ring axis then occurs in such a way that the ring rolls in contact about the spindle. This rolling movement can be compared approximately to the movement of a hula hoop about the dancer.

One of the advantages of the present invention is that the advantages cited in the introduction in connection with the planetary roller screw-thread drive are also realized in the linear drive apparatus according to one or more example embodiments. For example, in order to realize the gear function and consequently enable a direct drive, the outer diameter of the spindle and the inner diameter of the ring can vary from each other such that upon rotation of the inner casing and the associated rotation of the ring about the spindle, a transmission of rotational speed takes place between the inner casing and the ring. It follows that the quotient or the ratio of dimensions of the diameter of the ring and the diameter of the spindle determines the transmission ratio of the gear function in the linear drive apparatus according to one or more example embodiments. Via suitably selecting these diameters, it is consequently possible selectively to adjust the advance rate, i.e. the distance covered in terms of the linear movement per rotation cycle. It is therefore possible using the inventive linear drive apparatus to realize an embodiment variant in which high rotational speeds generate only little advance. Conversely, it is possible to realize an embodiment variant in which a comparatively greater advance is already generated at low rotational speeds.

In addition to this advantage, the inventive linear drive apparatus represents a simplification of the known planetary roller screw-thread drive. For example, all components rotate in the same direction in the inventive linear drive apparatus, producing a reduction of the relative movements that occur and consequently the resulting frictional losses and wear phenomena. Furthermore, the present invention realizes a robust structural format since no delicate structural elements such as toothed wheels are required.

The inventive linear drive apparatus comprises the outer casing and the inner casing which is supported in the outer casing via the at least one main bearing in such a way that the inner casing is able to rotate about a main axis, this being positionally fixed relative to the outer casing, and is positionally fixed linearly along the main axis. The outer casing can consist of a synthetic material and/or a metal. The main axis can be a central axis or symmetry axis of the inner casing. In the outer casing are housed further components of the linear drive apparatus, for example the inner casing, the ring and a section of the spindle. The spindle, which can also be referred to as a bar or shaft, inventively extends along the main axis so that a longitudinal axis of the spindle coincides with the main axis. The main bearing allows a turning movement of the inner casing around the spindle. The main bearing is designed in such a way, for example via corresponding limit stops, that any displacement of the inner casing along the main axis and therefore along the spindle is not possible.

Furthermore, provision is inventively made for the ring to be supported in the inner casing via the at least one radial bearing in such a way that said ring is able to rotate about a ring axis, this being positionally fixed relative to the inner casing, and is positionally fixed linearly along the ring axis. The inner casing and/or the ring can consist of a synthetic material and/or a metal. The ring axis can be a central axis or symmetry axis of the ring. The inner casing houses further components of the linear drive apparatus, for example the ring and a section of the spindle. The radial bearing allows a turning movement of the ring about the ring axis. The main axis and the ring axis run in particular parallel with each other, but are not identical here. During the rotation of the system, an eccentricity is therefore present between the inner casing and the ring and hence between the spindle and the ring, the main axis being positionally fixed relative to the outer casing and the spindle, and the ring axis rotating about the main axis. The radial bearing is designed in such a way that, for example via corresponding limit stops, any displacement of the ring along the ring axis and hence along the spindle is not possible.

The diameters and rotation radii relating to the relevant components, in particular the spindle, the ring and the inner casing, are such the outer contour of the spindle and the inner contour of the ring engage locally with each other along the circumferential direction extending around the main axis. The wording "locally" here means that this engagement is not present over the entire circumference, as would be the case if the eccentricity was not present and if the diameters of the spindle and of the ring were the same, but is only present over a part section of the circumference. Within this part section, in particular, the contours mesh with each other and separate again.

The inner contour and the outer contour can be adapted to each other in respect of their geometric shape. One of the contours preferably represents a negative of the other contour. The outer contour and/or the inner contour can have an oblique configuration relative to the main axis, such that the relative movement which correspondingly occurs between the contours upon rotation of the ring about the spindle causes the advance movement of the spindle. The contours can have elongated structures which engage with each other, and which roll against each other lengthwise upon rotation of the ring about the spindle, in particular in order to achieve minimal friction.

The outer contour of the spindle and the inner contour of the ring preferably engage with each other in a frictional manner. This means that the forces that occur during the rotation and rolling in contact of the ring about the spindle are transferred by frictional forces, more precisely static frictional forces, since the relevant surfaces here are pressed onto each other. In normal operation of the linear drive apparatus, the frictional forces that occur are generally sufficiently small to prevent the surfaces from sliding, i.e. slippage between the inner contour and the outer contour.

The outer contour is preferably an external thread. The spindle can therefore be a threaded rod. The external thread can have an outer diameter between 0.5 mm and 20 mm. Additionally or alternatively, the inner contour can be an internal thread. The ring can therefore be a nut or threaded nut and the inner casing can be referred to as a nut casing. The internal thread can have an inner diameter between 1 mm and 30 mm. The external thread and the internal thread preferably have the same pitch.

With regard to the thread, provision can be made for the external t thread and/or the internal thread to be a trapezoidal thread. In the case of the trapezoidal thread, the thread paths have a trapezoidal contour relative to a section along the main axis. Trapezoidal threads can be manufactured using modest resources and at low cost in comparison with other thread geometries, particularly in bulk. By virtue of the trapezoidal shape in particular, the ring and the spindle can be reciprocally supported free from play in respect of linear movement along the main axis.

As mentioned above, provision is made for the main axis and the ring axis to run approximately parallel with each other. Particularly in the exemplary embodiment in which threads are provided as contours, the term "approximately parallel" can signify that a corresponding deviation is no greater than 5°, in particular no greater than 1°. With regard to the parallel course of these axes therefore, the angular deviation when threads are present is caused by the fact that although the threaded rod and the nut have fundamentally the same thread pitch, these nonetheless vary slightly from each other locally, i.e. also at the engagement points of the contours, due to the different diameters. In other words, the distance that is covered along the main axis during a thread revolution is identical for both threads, yet the lengths along the circumferential direction differ due to the differing diameters. If the threads were unwound, this would result in pitch triangles of identical height but differing lengths for the thread path.

According to a further possible embodiment of the inventive linear drive apparatus, the inner contour is a circumferential projection. Said projection can be without pitch, i.e. extending only along the circumferential direction but not obliquely along the main axis. In a simple case, the ring with the circumferential projection is a pierced disc. Its spread extending along the main axis is sufficiently small for the disc edge to engage as an inner contour in the outer contour, in particular in a thread path of the external thread.

Concerning the feature that the main axis and the ring axis can run approximately parallel with each other, this can signify in the context of this embodiment variant that a corresponding deviation is than greater 5°. The circumferential projection can thus engage in the thread path so that the angular position of the ring axis corresponds to the thread pitch of the spindle. This angle can also be greater than 5°.

The at least one main bearing and/or the at least one radial bearing can be a ball bearing or a roller bearing. In this case, balls or rollers are provided between two concentric bearing surfaces. The bearing surfaces can be formed on races of the respective bearing, said races being attached to the components that are to be connected via the bearing. The bearing surfaces can be outer surfaces of the components that are to be connected via the bearing in each case.

Provision can be made for the inner casing to have an outer surface which is at least in part rotationally symmetrical about the main axis, and an inner surface which is at least in part rotationally symmetrical about the ring axis and is eccentric in relation to the outer surface, the main bearing coupling the outer surface to the outer casing and the radial bearing coupling the inner surface to the ring. In other words, the hollow inner casing has an internal space whose geometric shape is arranged eccentrically relative to the geometric external shape of the inner casing. The variation between the main axis and the ring axis is realized in this embodiment variant by the specific geometric embodiment of the inner casing. A central symmetry axis of the external shape of the inner casing coincides with the main axis. A central symmetry axis of the internal space of the inner casing coincides with the ring axis. At least part of the rotationally symmetrical outer surface and/or of the rotationally symmetrical inner surface can be connected to one of the races or form one of the bearing surfaces.

Alternatively, the outer surface of the inner casing and the inner surface of the inner casing can be arranged concentrically relative to each other. According to this embodiment variant, the variation between the main axis and the ring axis can be realized via an elastic spring element. This can press the ring sideways onto the spindle and thereby effect the engagement of the contours. The elastic spring element can push against both the inner surface of the inner casing and an outer surface of the ring.

The inventive linear drive apparatus can have at least one securing element whereby an element engagement contour of the securing element engages locally along the circumferential direction with a ring engagement contour of the ring, thereby preventing the outer contour from sliding against the inner contour. The securing element can be positionally fixed relative to the outer casing, in particular attached thereto. As mentioned above, the frictional forces between the inner contour and the outer contour are generally sufficiently small to prevent the occurrence of slippage between the inner contour and the outer contour. In practice, particularly when the structural elements are under high load, it is however not impossible for the static friction between the inner contour and the outer contour to be overcome and for slippage to occur. This is disadvantageous with regard to uniform guidance of movement. This is also disadvantageous if a stepper motor is used as a driving means for the linear drive apparatus. Via individually pulsed current signals or control signals, the stepper motor produces a stepped rotation of the rotor which can be transferred to the inner casing of the linear drive apparatus. On the basis of these signals, it is possible to infer the linear movement that has been achieved. This is only possible if there is no sliding of the outer contour relative to the inner contour, and this can be ensured via the engagement contours.

The securing element can be a securing ring or a securing sleeve with an external toothed rim as the element engagement contour. The ring can have a sleeve section with an internal toothed rim as the ring engagement contour. According to this embodiment variant, the toothed rims have differing diameters in order to allow engagement at one point or locally along the circumferential direction. The sleeve section can be attached or formed at the front of the ring. The sleeve section can form a section of the ring which is expanded in terms of diameter and into which the securing ring or securing sleeve is axially inserted. According to a possible embodiment variant, the ring has a sleeve section with an internal toothed rim at both front ends. In this embodiment variant, provision is made for two securing rings or securing sleeves with an external toothed rim accordingly.

With regard to the outer casing, provision is preferably made for this to have two openings, a tubular connecting piece being arranged at each of these and the spindle passing through said tubular connecting pieces. The longitudinal directions of the tubular connecting pieces extend along the main axis such that each of the tubular connecting pieces surrounds part of the spindle. An inner diameter of the tubular connecting pieces preferably corresponds approximately to the outer diameter of the spindle or is slightly larger. The tubular connecting pieces therefore realize linear guide bearings for the spindle. The tubular connecting pieces, which can also be referred to as tube sections, can consist of a synthetic material and/or a metal. The tubular connecting pieces can be welded onto the outer casing. The tubular connecting pieces preferably project into the inside of the outer casing, in particular thereby realizing a flush construction of the outer surface of the outer casing.

If provision is made for the previously described securing element in the form of the securing ring or the securing sleeve, the securing element is preferably the tubular connecting piece.

Furthermore, the inner casing can be supported on the outer casing via the tubular connecting piece. One of the races of the respective bearing can be attached to the tubular connecting piece correspondingly. It is also conceivable for one of the bearing surfaces of the respective bearing to be provided as the outer surface of the tubular connecting piece.

Conceivably in principle, the spindle is or can be supported in a rotatable manner relative to the main axis. The spindle is preferably supported or can be supported in a non-rotatable manner relative to the main axis. The disadvantageous possibility therefore exists that the spindle could start to oscillate during the longitudinal displacement if it also rotates at the same time. This is prevented if the spindle is supported in a non-rotatable manner. With regard to the non-rotatable support of the spindle, provision can be made for the spindle to be supported in corresponding guides which allow the longitudinal displacement and prevent any turning movement thereof. The non-rotatable support of the spindle can be realized by connecting the spindle in a fixed or non-rotatable manner to a component of an apparatus which comprises the inventive linear drive, said component being guided via corresponding guide components such as guide rails or the like.

Provision is preferably made for the inventive linear drive apparatus to have or form an electrical machine via which a rotatably supported component of the linear drive apparatus, in particular the inner casing and/or the spindle, can be caused to rotate. The electrical machine can be arranged in the outer casing, with the electrical machine and the rotatably supported component being able to be interconnected via a drive belt. The rotatably supported component, for example the inner casing, can form a pulley which is connected via the drive belt to the electrical machine. The geometric external shape of this component, for example the inner casing, can have a circumferential guide groove for guiding the drive belt.

Provision is most preferably made for the linear drive apparatus to form an electrical machine comprising a rotor and a stator, the inner casing representing the rotor of the electrical machine. The linear drive apparatus functions in a synergetic manner, firstly as a motion converter in terms of the rotational and advance movement, secondly as a transmission gear, and thirdly as a driving means or energy converter via which electrical energy can be converted into kinetic energy. The inner casing which forms the rotor can therefore have permanent magnets or windings made from an electrically conductive wire. These interact with corresponding wound coils or permanent magnets of the stator in such a way that electrical currents are converted into a turning movement of the rotor. The stator is a separate component from the rotor and, like the rotor, extends in a rotationally symmetrical manner around the main axis. The stator and the rotor are arranged in the outer casing. The stator surrounds the rotor along the circumferential direction.

The object is inventively achieved further by a medical technology apparatus of the type cited in the introduction, said medical technology apparatus having a linear drive apparatus as described above, the first component being coupled to the spindle and the second component to the outer casing, with provision being made for an electrical machine which is in particular a stepper motor and via which the inner casing or the spindle can be caused to rotate. All of the advantages, features and aspects explained in connection with the inventive linear drive apparatus can be applied equally to the inventive medical technology apparatus and vice versa.

With regard to the inventive medical technology apparatus, it is conceivable for the first component, this being coupled to the spindle, to be immobile in relation to the earth-fixed or positionally fixed inertial system. In this case, the motion conversion of the rotation into the advance movement results in a movement of the outer casing along the spindle, the spindle remaining positionally fixed at its position. It is also conceivable for the second component, this being coupled to the outer casing, to be immobile in relation to the earth-fixed or positionally fixed inertial system. In this case, the motion conversion of the rotation into the advance movement results in a movement of the spindle along the main axis, the outer casing remaining positionally fixed at its position.

The inventive medical technology apparatus can be a patient support table. This typically has a support pillar or support base as a positionally fixed component, and a table top in the form of a bearing surface as a mobile component. The outer casing is preferably connected to the support pillar and the spindle to the table top. It is therefore possible via the linear drive apparatus to realize height adjustability for the table top.

The inventive medical technology apparatus can also be an imaging device. In this case likewise, provision is therefore made for positionally fixed components such as support bases or the like to be coupled to relatively mobile components such as radiation sources and/or patient support surfaces.

In principle, the inventive linear drive apparatus can be used as a component in any apparatus which incorporates components that move relative to each other. Examples include machine tools such as metal processing machines, for example metalworking lathes or milling machines.

With regard to the relative movements that are explained in the context of this description, it should be noted in addition that the wording according to the concept "a first object moves relative to a second object" equally means that the second object moves relative to the first object. In the case of a corresponding relative movement, the reference frame can therefore also be defined as fixed relative to the other object concerned. Relative to an earth-fixed or positionally fixed inertial system, in particular either the outer casing or the spindle is positionally fixed. In other words, the linear or advance movement which occurs in the context of the inventive linear drive apparatus relative to the positionally fixed inertial system can apply to either the outer casing or the spindle.

FIG. 1 shows an exemplary embodiment of an inventive medical technology apparatus 1 which is a patient support table. The medical technology apparatus 1 comprises a linear drive apparatus or 2 according to one more example embodiments, via which a rotational or turning movement can be converted into a linear or advance movement. The linear drive apparatus 2 comprises an outer casing 3 and a spindle 4 which is guided through this. The spindle 4 can move linearly along its longitudinal axis, this being spatially vertical in the situation shown in FIG. 1.

The medical technology apparatus 1 comprises a first component 5 which takes the form of a table top and is coupled to the spindle 4. The table top is supported allowing for linear movement via further guide components of the medical technology apparatus 1 such as guide rails (not shown in FIG. 1), in order to ensure stable and secure guidance of the table top movement. Furthermore, the spindle 4 is non-rotatably connected to the table top, so that the spindle 4 is supported in a non-rotatable manner. It is equally possible, though not envisaged in this case, for the spindle 4 to be supported in a rotatable manner. The medical technology apparatus 1 further comprises a second component 6 in the form of a support pillar or support base, which is securely arranged on a floor or subsurface 7 and bears the first component 5. The outer casing 3 is connected to the second component 6. Height adjustability of the medical technology apparatus 1 or table top is thus realized via the linear drive apparatus 2.

Figure 2:
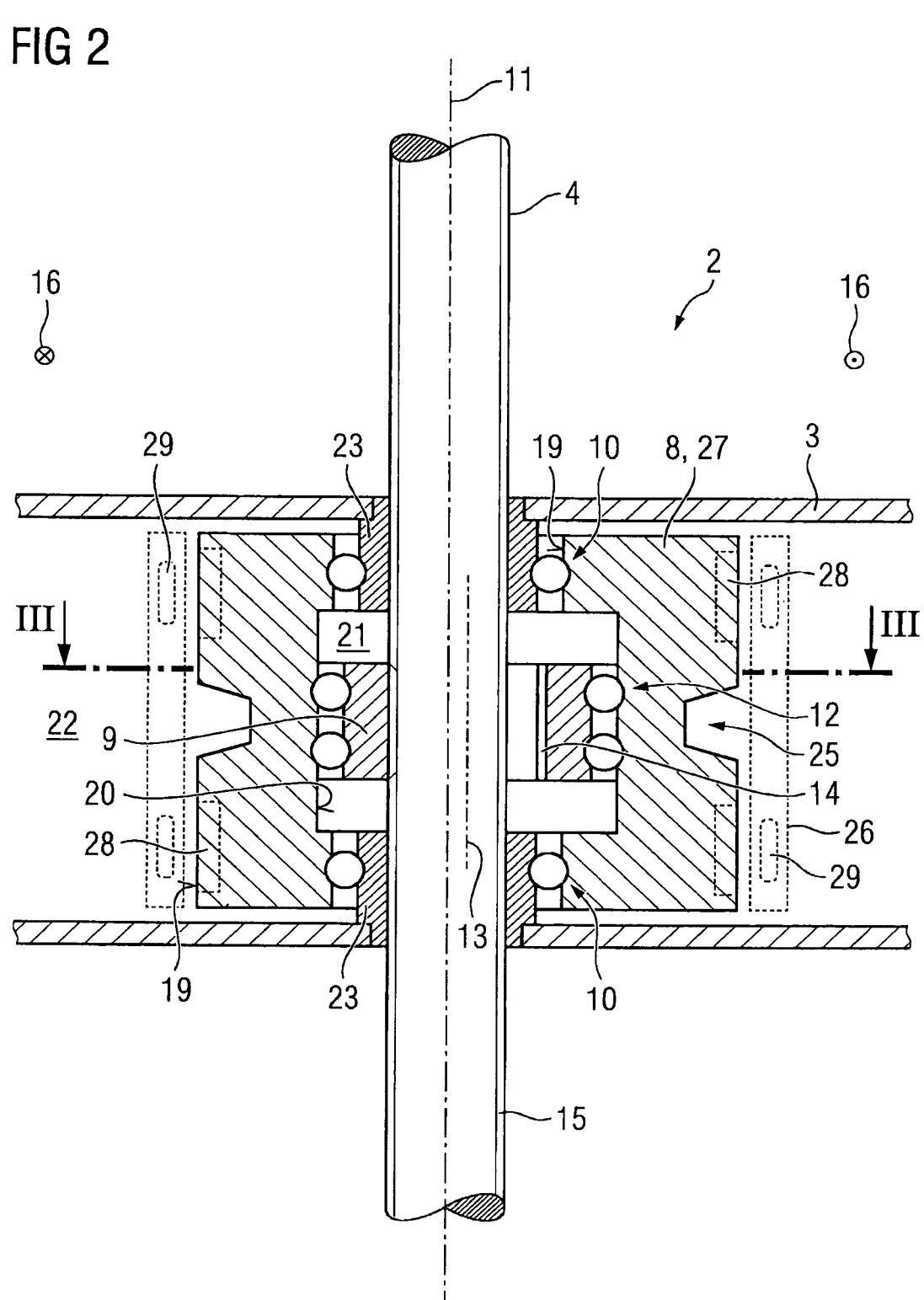
Figure 3:
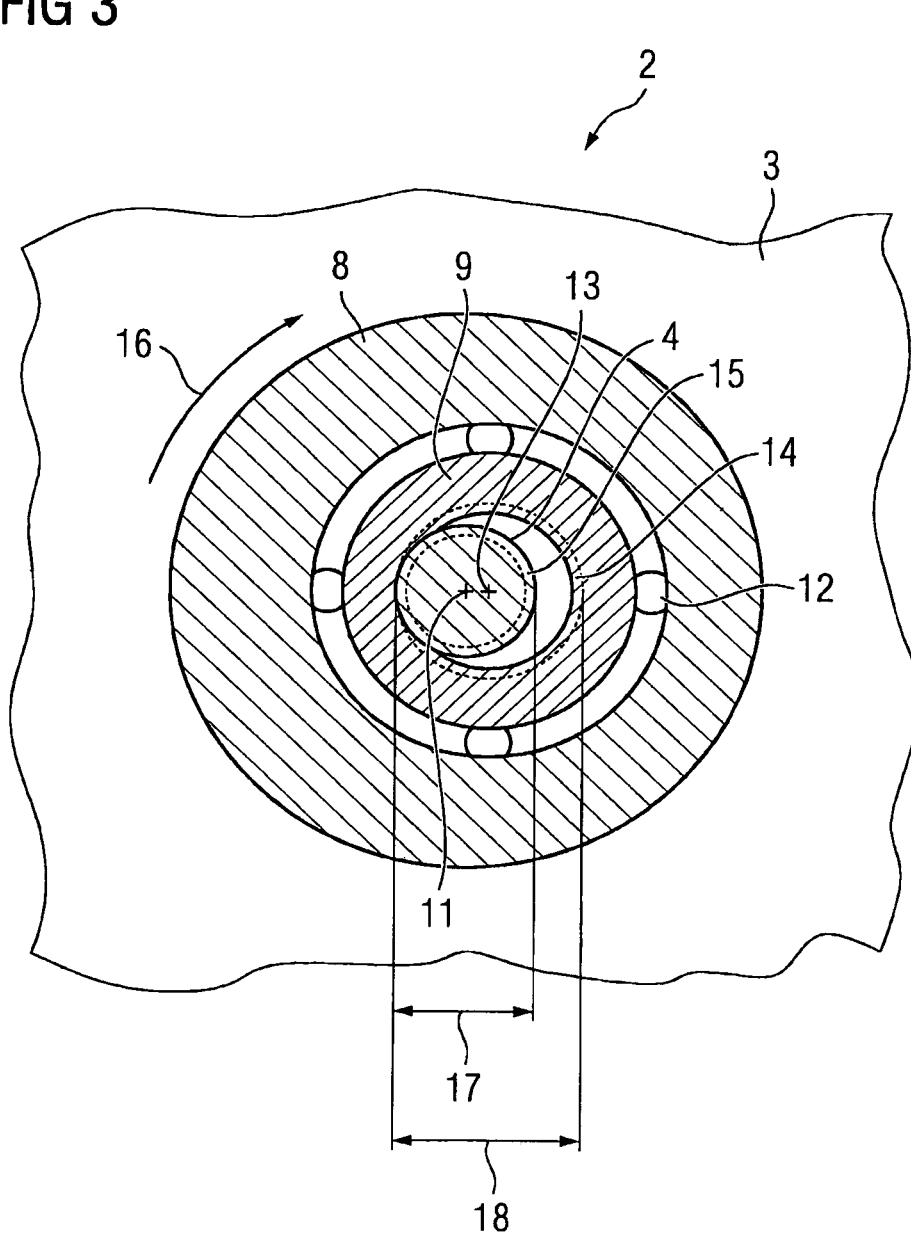

FIG. 2 shows a sectional view with a vertical sectional plane through the inventive linear drive apparatus 2 according to a first exemplary embodiment, as can be used in the case of the medical technology apparatus 1 as per FIG. 1. A further sectional view though the linear drive apparatus 2 is shown in FIG. 3, the sectional plane of FIG. 3 being indicated by the line III-III in FIG. 2. In addition to the outer casing 3 and the spindle 4, the linear drive apparatus 2 comprises an inner casing 8 and a ring 9, the spindle 4 passing through these as well as through the outer casing 3.

The inner casing 8 is supported in the outer casing via two main bearings 10 in such a way that the inner casing 8 is able to rotate about a main axis 11 which is positionally fixed relative to the outer casing 3. The main axis 11 coincides with the longitudinal direction of the spindle 4. The inner casing 8 is supported so as to be positionally fixed linearly along the main axis 11. The ring 9 is supported in the inner casing 8 via a radial bearing 12 in such a way that the ring 9 is able to rotate about a ring axis 13 which is positionally fixed relative to the inner casing 8. The main axis 11 and the ring axis 13 run parallel with each other, in particular approximately parallel with each other, and deviate or are arranged apart from each other such that the inner casing 8 and the ring 9 are supported in a reciprocally eccentric manner. This eccentricity is particularly clear in FIG. 3. The two main bearings 10 and the radial bearing 12 are each designed as a ball bearing, but can equally be for example a roller bearing or other suitable bearing.

An inner contour 14 representing an internal thread is provided on an inner surface of the ring 9 and an outer contour 15 representing an external thread is provided on an outer surface of the spindle 4. The spindle 4 is a threaded rod with a circular cross section and the ring 9 is a threaded nut. Instead of having the internal thread as an inner contour 14, the ring 9 can alternatively have a circumferential projection, in particular without pitch, the ring 9 being for example a pierced disc in this case. In the present case, however, the inner contour 14 and the outer contour 15 are each a thread, specifically a trapezoidal thread.

The contours 14, 15 engage with each other locally in a frictional manner along a circumferential direction 16 extending around the main axis 11. In particular, the thread pitches of the contours 14, 15 are identical, in particular approximately identical, so that the sections of the contours 14, 15 which engage with each other are diametrically opposed reflections or negatives of each other.

As mentioned above, the main axis 11 and the ring axis 13 need not run exactly parallel with each other, but can also run only approximately parallel with each other. This is due to the fact that although both the spindle 4 and the ring 9 have fundamentally the same thread pitch, these nonetheless deviate slightly from each other locally or in the region of the engagement due to the differing diameters. In this context, a slight misalignment of the two axes 11, 13 relative to each other therefore occurs as a result of the engagement.

A concept which is realized one or more example embodiments, for converting the rotational movement into the linear movement and vice versa, is explained in the following. An initial situation assumes a turning movement of the inner casing 8 about the main axis 11, which movement causes the ring 9 to follow due to the eccentricity that is present. The turning movement of the inner casing 8 results in a turning movement of the ring 9 about the ring axis 13. As a result of the engagement of the contours 14, 15 and their design as threads, the rotation of the ring 9 about the ring axis 13 causes the contours 14, 15 to roll against each other and, due to their oblique thread paths, a linear advance of the spindle 4 along the main axis 11 is produced.

This illustrates one of the central advantages of the present invention, namely the realization of a gear function in the linear drive apparatus 2 and therefore the possibility of a direct drive for the medical technology apparatus 1. The outer diameter 17 of the spindle 4 and the inner diameter 18 of the ring 9 therefore differ from each other in such a way that the rotation of the inner casing 8 and the associated rotation of the ring 9 result in a transmission of rotational speed between the inner casing 8 and the ring 9. The ratio of the diameters 17, 18 determines the transmission ratio of the gear function.

Specific details concerning the structure of the linear drive apparatus 2 and the components are set forth in the following. The eccentricity described above is realized by virtue of the inner casing 8 having an outer surface 19 which is rotationally symmetrical about the main axis 11. This also has an inner surface 20 which is rotationally symmetrical about the ring axis 13, is eccentric relative to the outer surface 19, and delimits an internal space 21 of the hollow inner casing 8. The main bearings 10 couple the outer surface 19 to the outer casing 3 and the radial bearings 12 couple the inner surface 20 to the ring 9.

The eccentricity can alternatively be realized according to an exemplary embodiment which is not shown in the figures. In this case, the outer surface 19 and the inner surface 20 of the inner casing 8 are concentrically arranged. The variation between the main axis 11 and the ring axis 13 is realized via an elastic spring element, which presses the ring 9 sideways onto the spindle 4 and thereby effects the engagement of the contours 14, 15. The elastic spring element pushes against both the inner surface 20 of the inner casing 8 and a radially outer surface of the ring 9.

With regard to the outer casing 3, provision is made for this to have two diametrically opposed openings along the main axis 11, a tubular connecting piece 23 which projects into the inside 22 of the outer casing 3 being provided at each of said openings. The tubular connecting pieces 23 have an inner diameter that is slightly larger than the outer diameter 17 of the spindle 4 which passes through the tubular connecting pieces 23. The tubular connecting pieces 23 therefore represent linear guide bearings for the spindle 4. With regard to the tubular connecting pieces 23, provision is further made for a radial outer surface thereof to form in each case a bearing surface for one of the main bearings 10. This means that the inner casing 8 is supported on the outer casing 3 via the two tubular connecting pieces 23.

Again with reference to FIG. 1, the linear drive apparatus 2 has an electrical machine 24 via which the inner casing 8 can be caused to rotate. The two alternatives explained in the following can be used for this purpose.

According to the first alternative, provision is made for the inner casing 8 and the electrical machine 24 to be separate components. The electrical machine 24 is arranged in the outer casing 3. The inner casing 8 is a pulley with a circumferential belt groove 25 in which is guided a belt that is not shown in greater detail in the figures. The turning movement that is generated by the electrical machine 24 is transferred to the inner casing 8 via the belt.

According to the second alternative, provision is made for the linear drive apparatus 2 itself to form the electrical machine 24, this having a stator 26 and a rotor 27. The rotor 27 is realized by the inner casing 8 in this case. The inner casing 8 that forms the rotor 27 can have windings 28 made from electrically conductive wire which interact electromagnetically with permanent magnets 29 of the stator 26 in order to convert electrical energy into kinetic energy, i.e. into a turning movement of the rotor 27. In order to illustrate that, in the same way as the belt groove 25, the corresponding components are merely optional, the stator 26, the windings 28 and the permanent magnets 29 are indicated by dashed lines in FIG. 2.

Figure 4:
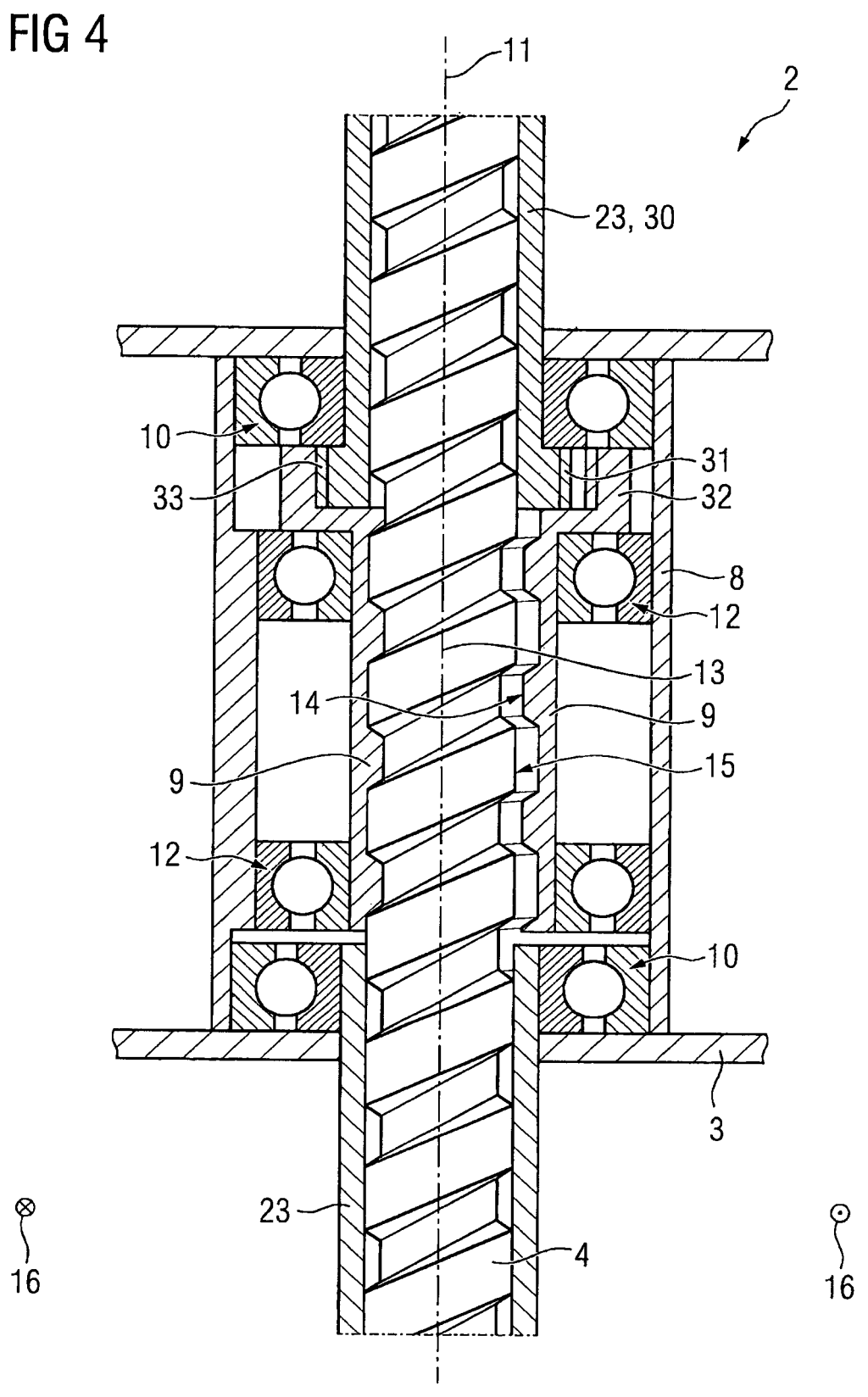

The electrical machine 24 is a stepper motor. Using the electrical machine 24, a stepped rotation of the rotor 27 is produced, said rotation being generated by individually pulsed current signals or control signals. On the basis of these signals, it is possible to infer the rotational movement of the inner casing 8 that has been achieved and therefore the corresponding linear movement of the spindle 4. A problem that can occur in this context is that with sufficiently high transfers of force, the structures 14, 15 can slip or slide against each other, thereby rendering impossible the use of the current signals or control signals as described above to determine the linear movement that has been achieved. FIG. 4 shows a sectional view through the inventive linear drive apparatus 2 according to a second exemplary embodiment, which can likewise be provided for the medical technology apparatus 1 as per FIG. 1 and via which this problem is overcome. With the exception of the points explained below, the linear drive apparatus 2 shown in FIG. 4 corresponds to that shown in FIG. 2.

The linear drive apparatus 2 shown in FIG. 4 therefore comprises a securing element 30, which is designed as a securing sleeve or a securing ring. The securing element 30 is realized by one of the tubular connecting pieces 23. The securing element 30, which in the present exemplary embodiment projects both internally and externally, has at its front end an element engagement contour 31 that is realized as an external toothed rim. At the front of the ring 9 is a sleeve section 32, on which is formed a ring engagement contour 33 in the form of an internal toothed rim. The engagement contours 31, 33 are arranged at the reciprocally facing front ends of the securing element 30 and the ring 9. The engagement contours 31, 33 engage with each other locally along the circumferential direction 16. By this means, the aforementioned problem relating to the sliding or slippage of the structures 14, 15 in the event of high transfers of force is overcome. The use of a stepper motor as an electrical machine 24 is therefore readily possible in this embodiment variant in particular.

Again with reference to FIG. 4, it is also conceivable for the ring 9 to also have at its other front end a corresponding sleeve section 32 with a ring engagement contour 33 which interacts as described with an element engagement contour 31 of the other tubular connecting piece 23.

Although the invention is illustrated and described in detail via example embodiments, the invention is not restricted by the examples disclosed herein and other variations may be derived therefrom by a person skilled in the art without departing from the scope of the invention.

Independent of the grammatical term usage, individuals with male, female or other gender identities are included within the term.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, as such "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be an otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless defined, terms otherwise all (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific structural and functional details disclosed herein are merely representative for purposes of describing example embodiments. The present invention may, however, be embodied in many alternate forms and should not be construed as limited to only the embodiments set forth herein.

The invention claimed is:

1. A linear drive apparatus for converting a rotational movement into a linear movement, the linear drive apparatus comprising:
  an outer casing;
  an inner casing supported in the outer casing via at least one main bearing such that the inner casing is rotatable about a main axis positionally fixed relative to the outer casing, and the at least one main bearing being positionally fixed linearly along the main axis;
  a ring supported in the inner casing via at least one radial bearing such that the ring is rotatable about a ring axis fixed relative to the inner casing, the at least one radial bearing being positionally fixed linearly along the ring axis;
  a spindle extending along the main axis and through the outer casing, the inner casing and the ring;
  an inner contour on an inner surface of the ring; and
  an outer contour on an outer surface of the spindle, wherein
    the main axis and the ring axis are arranged relative to each other such that the inner casing and the ring are supported in a reciprocally eccentric manner, and the outer contour and the inner contour engage with each other along a circumferential direction extending around the main axis,
    the engaging outer and inner contours result in a linear movement of the spindle along the main axis when the ring is rotated about the ring axis,
    an element engagement contour of at least one securing element engages locally along the circumferential direction with a ring engagement contour of the ring to prevent the outer contour from sliding against the inner contour,
    the at least one securing element is a securing ring or a securing sleeve with an external toothed rim as the element engagement contour, and
    the ring has a sleeve section with an internal toothed rim as the ring engagement contour.

2. The linear drive apparatus of claim 1, wherein the outer contour and the inner contour are engageable with each other in a frictional manner.

3. The linear drive apparatus of claim 1, wherein at least one of
  the outer contour is an external thread, or
  the inner contour is an internal thread or a circumferential projection.

4. The linear drive apparatus of claim 3, wherein at least one of the external thread or the internal thread is a trapezoidal thread.

5. The linear drive apparatus of claim 1, wherein at least one of the at least one main bearing or the at least one radial bearing is a ball bearing or a roller bearing.

6. The linear drive apparatus of claim 1, wherein the inner casing includes,
  an outer surface at least in part rotationally symmetrical about the main axis, and
  an inner surface at least in part rotationally symmetrical about the ring axis and eccentric in relation to the outer surface, wherein the at least one main bearing couples the outer surface to the outer casing and the at least one radial bearing couples the inner surface to the ring.

7. The linear drive apparatus of claim 1, wherein the outer casing has two openings, a tubular connecting piece being arranged at each of the two openings, wherein the spindle passes through the tubular connecting pieces.

8. The linear drive apparatus of claim 7, wherein the at least one securing element is the tubular connecting piece.

9. The linear drive apparatus of claim 7, wherein the inner casing is on the outer casing via the tubular connecting piece.

10. The linear drive apparatus of claim 1, wherein the spindle is supported relative to the main axis.

11. The linear drive apparatus of claim 1, wherein the inner casing is a rotor of an electrical machine.

12. A medical technology apparatus comprising:
  the linear drive apparatus of claim 1;
  a first component; and
  a second component which can move relative to the first component, wherein the first component is coupled to the spindle and the second component is coupled to the outer casing, wherein an electrical machine is provided via which the inner casing or the spindle can be caused to rotate.

13. The medical technology apparatus of claim 12, wherein the electrical machine is a stepper motor.

14. The linear drive apparatus of claim 3, wherein the inner contour is a circumferential projection without pitch.

15. The linear drive apparatus of claim 1, wherein the ring has the sleeve section at a front.

16. The linear drive apparatus of claim 7, wherein the two openings project into an inside of the outer casing.

17. The linear drive apparatus of claim 1, wherein
  the securing element projects both internally and externally relative to the outer casing; and
  the element engagement contour is at a front end of the at least one securing element and the ring engagement contour is at a front end of the ring.

* * * * *